(12) United States Patent
Birmingham et al.

(10) Patent No.: US 7,681,790 B2
(45) Date of Patent: Mar. 23, 2010

(54) COMPUTER SUPPORTED RETAIL SHOPPING SYSTEMS AND METHODS

(75) Inventors: Thomas Birmingham, Fort Worth, TX (US); Cyrus Dadgar, Irving, TX (US)

(73) Assignee: The Container Store, Coppell, TX (US)

( * ) Notice: Subject to any disclaimer, the term of this patent is extended or adjusted under 35 U.S.C. 154(b) by 107 days.

(21) Appl. No.: 11/450,746

(22) Filed: Jun. 9, 2006

(65) Prior Publication Data

US 2007/0284440 A1    Dec. 13, 2007

(51) Int. Cl.
*G06K 15/00* (2006.01)

(52) U.S. Cl. .................................. 235/383; 235/385

(58) Field of Classification Search ................ 235/383, 235/384, 385, 375; 705/26, 28
See application file for complete search history.

(56) References Cited

U.S. PATENT DOCUMENTS

| | | | |
|---|---|---|---|
| 5,434,394 A * | 7/1995 | Roach et al. .............. 235/375 |
| 5,970,474 A | 10/1999 | LeRoy et al. |
| 6,101,483 A | 8/2000 | Petrovich et al. |
| 6,199,753 B1 * | 3/2001 | Tracy et al. .............. 235/375 |
| 6,625,580 B1 | 9/2003 | Tayama |
| 6,640,214 B1 * | 10/2003 | Nambudiri et al. ........ 705/26 |
| 2001/0037259 A1 | 11/2001 | Sharma et al. |
| 2002/0147667 A1 | 10/2002 | Shiba et al. |
| 2002/0152128 A1 * | 10/2002 | Walch et al. .............. 705/26 |
| 2002/0161658 A1 | 10/2002 | Sussman |
| 2002/0169683 A1 | 11/2002 | Parpart |
| 2003/0046173 A1 * | 3/2003 | Benjier et al. ............. 705/26 |
| 2003/0093333 A1 | 5/2003 | Veeneman |
| 2003/0101107 A1 * | 5/2003 | Agarwal et al. ........... 705/28 |
| 2003/0195818 A1 | 10/2003 | Howell et al. |
| 2003/0200152 A1 | 10/2003 | Divekar |
| 2004/0176962 A1 * | 9/2004 | Mann et al. ............... 705/1 |
| 2004/0254855 A1 | 12/2004 | Shah |
| 2004/0254861 A1 | 12/2004 | Pentel |
| 2004/0260618 A1 | 12/2004 | Larson |
| 2005/0040230 A1 | 2/2005 | Swartz et al. |
| 2005/0086128 A1 | 4/2005 | Shanahan |
| 2005/0154646 A1 | 7/2005 | Chermesino |

\* cited by examiner

*Primary Examiner*—Daniel St. Cyr
(74) *Attorney, Agent, or Firm*—Thompson & Knight LLP; James J. Murphy (57) ABSTRACT

A computer assisted shopping system includes a hand-held scanner for customer scanning of information associated with a product in a retailing facility and a networked system. The networked system stores customer delivery preference information and downloads information from the hand-held scanner, as scanned by a customer, to a register. A product order is generated at the register from the information downloaded from the scanner and the customer delivery preference information, and available delivery dates and times based on inventory availability are determined. Delivery options are provided for the customer based on the available delivery dates and times. A delivery option selection and commitment from the customer close the order.

16 Claims, 12 Drawing Sheets

COMPUTER SUPPORTED RETAIL SHOPPING SYSTEMS AND METHODS

FIELD OF INVENTION

The present invention relates in general to electronic retailing techniques, and in particular, to computer supported retail shopping systems and methods.

BACKGROUND OF INVENTION

In today's competitive retailing environment, maintaining a high level of customer service is paramount to ensuring satisfied customers and a thriving business. This is especially true in retail stores that often serve customers whose ability to shop is constrained by their lifestyle, for example those customers who work full-time or live or work within a large city. Simply put, to stay competitive in such an environment, a retailer must be highly motivated and innovative.

Providing a shopping environment that maximizes customer convenience, individualized service, and business efficiency, is a challenging proposition. For example, a typical customer may wish to shop at their own pace and with minimal interaction with store personnel; yet, when that shopper does require help, he or she may also expect that the store personnel be immediately available and well prepared to address the customer's needs. Moreover, most shoppers do not like to wait in checkout lines, especially when the preceding customers have large numbers of items requiring scanning and ring-up. The shopping experience can become even more burdensome when customers must carry their selected items or push an unwieldy shopping cart around the store as they shop. The burden of moving items, besides adversely impacting the customer's shopping experience, also directly impacts the retailer's bottom line as such customers often limit the number of items they purchase.

Delivery of purchased items from the store to the customer's home or business is one significant convenience that a retailer can provide for a customer, particularly in city environments where transporting products, especially bulky ones, is difficult or impractical. Notwithstanding, in order to make delivery a viable option, the retailer must have a well-developed routine for marshalling items chosen by the customer within a staging area within the store, preparing those items for delivery, and then managing the delivery itself.

Similarly, when an item is not available at the local outlet in a quantity that a customer desires, the retailer needs an efficient means by which that item can be located within other outlets, or the retailer's distribution system, such that reasonably accurate estimation of delivery time can be promised to the customer. The capability of providing the item within the promised time period not only preserves the current sale, but also builds up goodwill in the customer with respects to potential future sales.

Maintaining goodwill with customers, whether they are individuals or other businesses, is the bedrock of almost any business. In the retail context, knowing a returning customer's purchasing history allows the retailer to add a personal touch to the shopping experience, as well as provide rewards for loyalty. Identification of new customers allows a retailer to tailor their services with an aim to making those new clients regular customers. Nevertheless, learning about a customers habits must not be intrusive, but still allow the retailer to specifically target goods and services to the most relevant customers.

Hence, in the highly competitive, high-service, retail market, new methods and support systems are required to provide the highest level of service possible, while maintaining cost effectiveness and efficiency.

SUMMARY OF INVENTION

The principles of the present invention are embodied in computer assisted shopping systems and methods. According to one representative embodiment, a computer assisted shopping system is disclosed that includes a hand-held scanner for customer scanning of information associated with a product in a retailing facility and a networked system. The networked system stores customer delivery preference information and downloads information from the hand-held scanner, as scanned by a customer, to a register. A product order is generated at the register from the information downloaded from the scanner and the customer delivery preference information, and available delivery dates and times based on inventory availability are determined. Delivery options are provided for the customer based on the available delivery dates and times. A delivery option selection and commitment from the customer close the order.

Embodiments of the present principles realize substantial advantages for both customers and retailers in any high-service retailing environment. For the customer, the hand-held scanner allows for free movement about the store without the burden of carrying merchandise or pushing a shopping cart. The shopping experience is further enhanced by a faster checkout process and assurance that the purchased merchandise will be delivered to the customers home or business at a time and date of the customer's choice.

The principles of the present invention allow the retailer more efficiently and less expensively provide the high levels of service demanded by customers. Among other things, the retailer can monitor each customer carrying a hand-held scanner and provide customer assistance as soon as necessary. Retailing facilities are less cluttered with shopping carts and the burdens on store clerks are reduced at the checkout counter. Moreover, the retailer can efficiently manage merchandise inventory such that the customer delivery expectations can consistently and cost-effectively met.

In sum, providing a better shopping experience for the customer increases goodwill and sales per visit.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1-5 of the drawings, in which like numbers designate like parts.

Figure 1A:
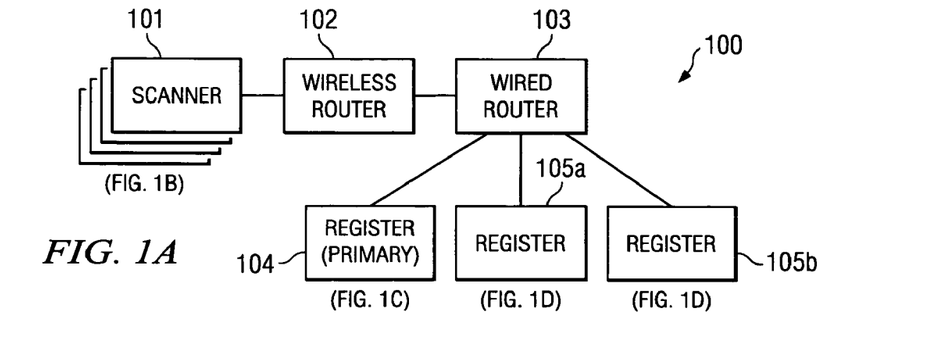
FIG. 1A is a high level block diagram of a representative computer assisted shopping system suitable for describing the principles of the present invention.
Figure 1B:
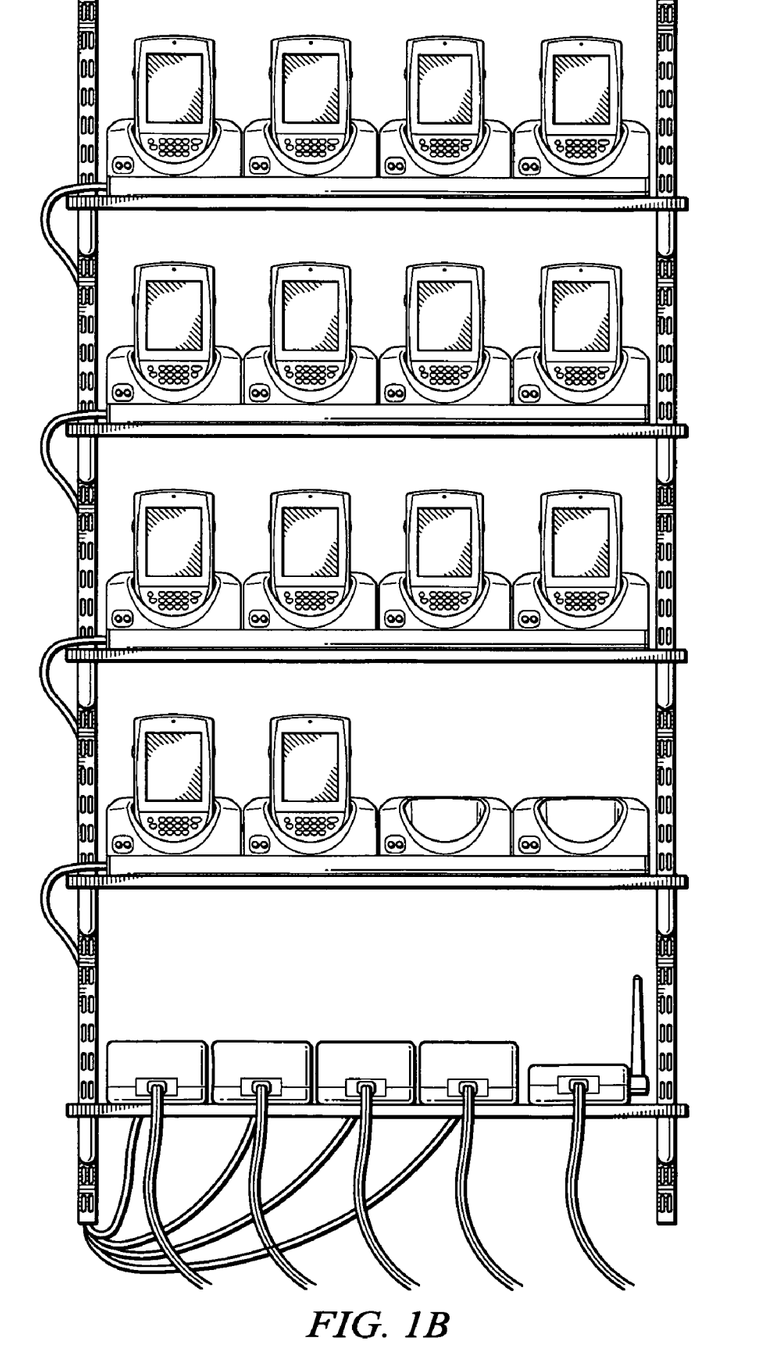
FIG. 1B is a conceptual diagram of typical store shelving holding a set of hand-held scanners, within their charging cradles, in one representative implementation of the system shown in FIG. 1A.

FIG. 1A is a high level block diagram of an exemplary computer assisted shopping system 100 embodying the principles of the present invention. Generally, shopping system 100 includes a set of hand-portable scanners 101 for checking-out to customers in a store or other retailing environment. FIG. 1B illustrates a typical set of scanners 101, installed in their charging cradles and shelved within a typical store environment. The individual scanners will be discussed further below in conjunction with FIG. 2.

Figure 1C:
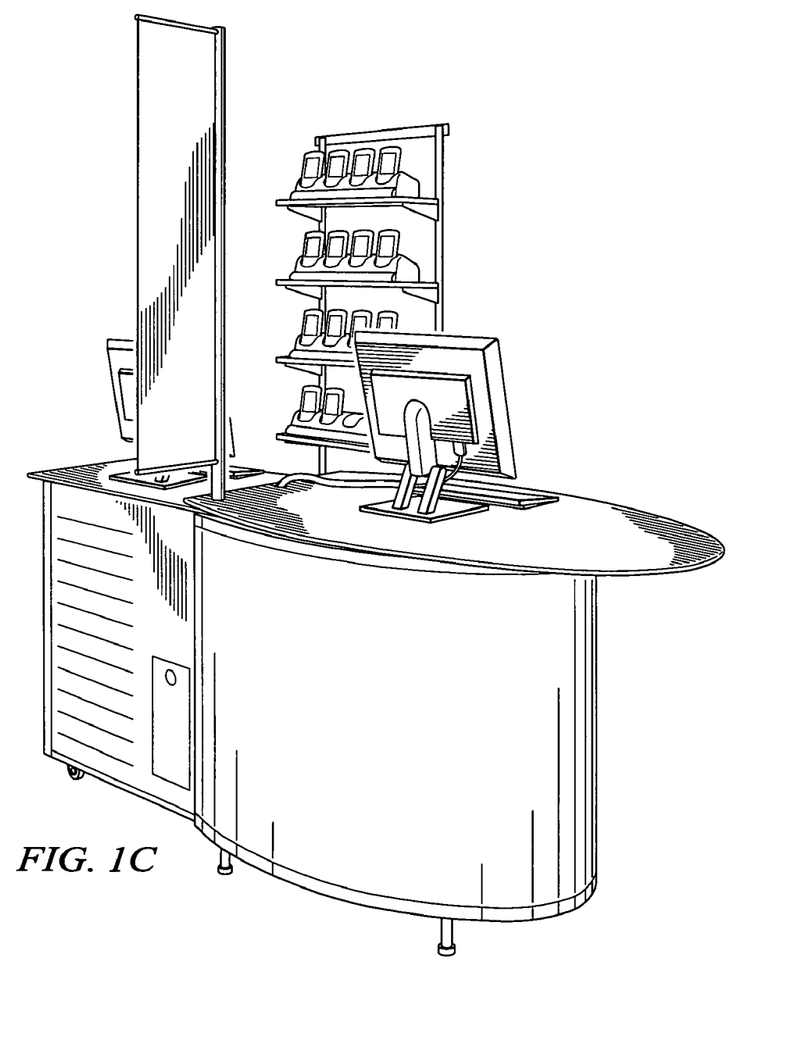
FIGS. 1C and 1D are conceptual diagrams of representative implementations of the primary and secondary store registers shown in FIG. 1A.
Figure 1D:
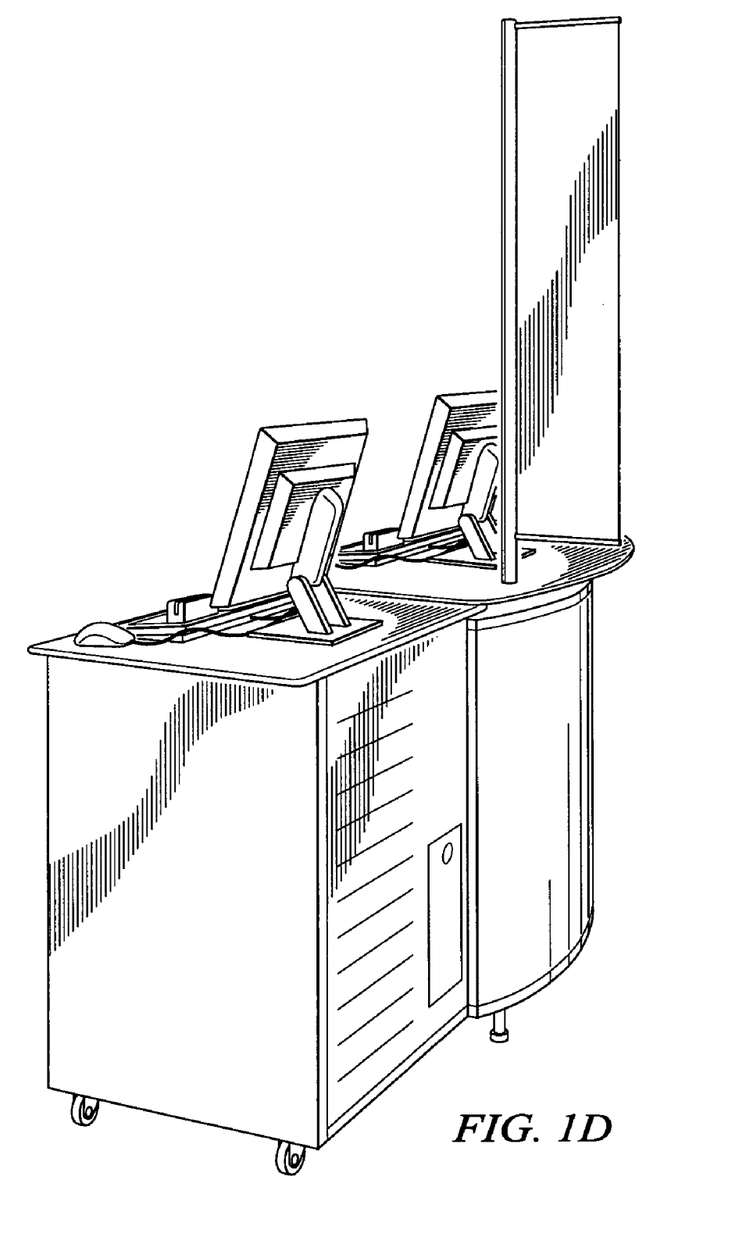

Scanners 101 communicate through a wireless router 102 and a wired router 103 to at least one store register. In the illustrated embodiment, shopping system 100 includes a primary register 104 and two additional (secondary) registers 105a-105b. Representative registers are shown in FIGS. 1C and 1D.

Figure 2:
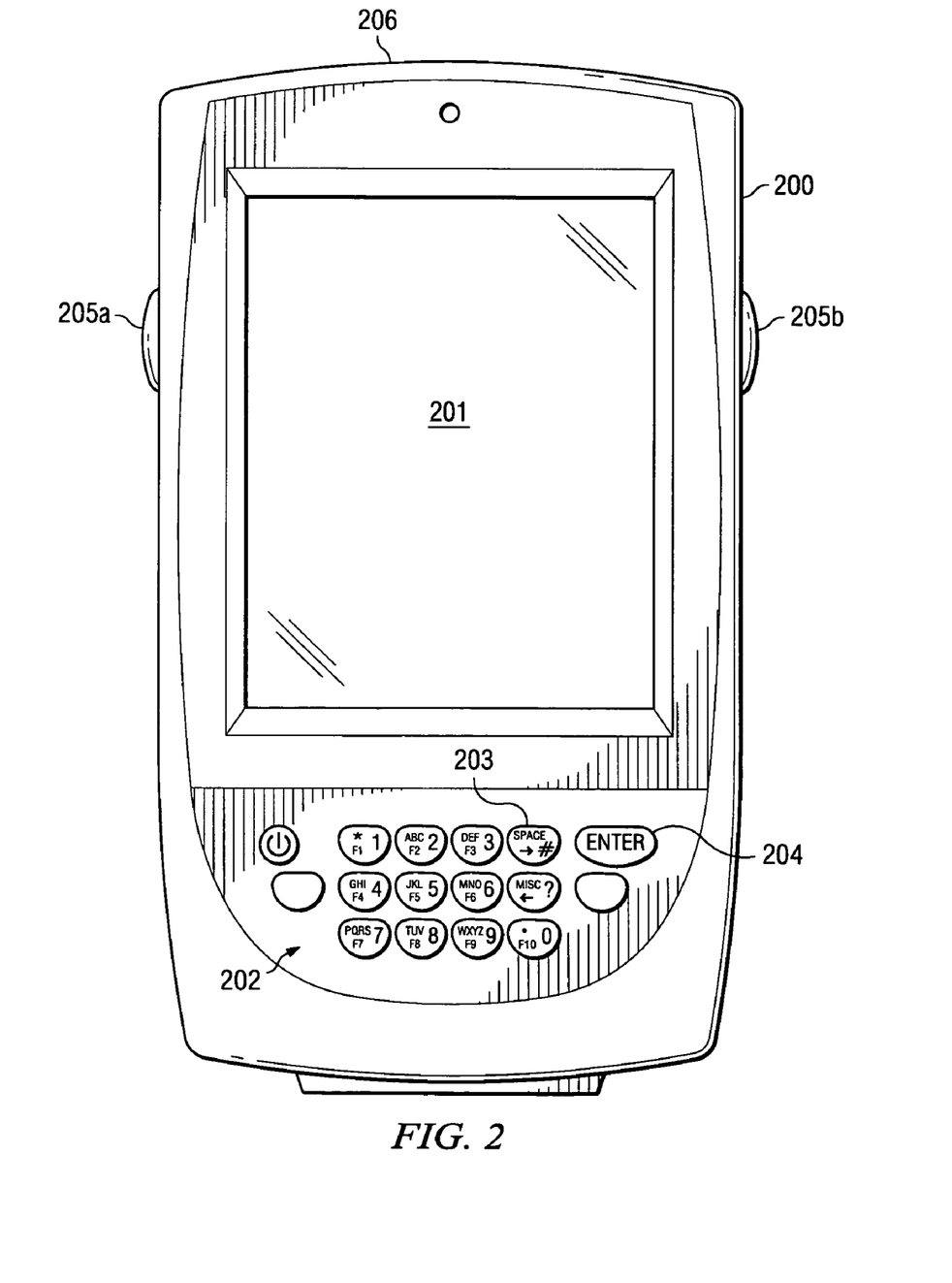
FIG. 2 is a diagram of an exemplary hand-held scanner suitable for use in the system shown in FIG. 1A.

FIG. 2 is a conceptual diagram of a selected hand-held scanner 200, as selected from scanner set 101 of FIG. 1A. Hand-held scanner 200 includes a display screen 201, a keypad 202 including numerical keys 203 and an entry key 204, and a pair of scan-trigger buttons 205a and 205b.

In the preferred embodiment, hand-held scanner 200 is a Symbol Technologies PPT880 running Java routines and Microsoft Pocket PC Version 4.20 application software. The application is a full screen application; however, the windows menu bar and SIP (soft input panel) are hidden from the customer. Scan-trigger buttons 205a and 205b fire a laser beam emitter 206 from the scanner front panel that allows scanning of UPC barcodes on products. Numeric keypad 202 is used to enter item quantities after the customer has scanned the bar code on a desired product.

Generally, the scanner software application is a multi-thread Java swing program. One thread monitors network strength and updates a network strength graphic on display screen 201. Another thread monitors the battery level and updates a similar battery graphic. A further thread is used to periodically refresh the item table (virtual shopping cart) discussed below, even if the network is not available. A heartbeat thread periodically sends out scanner status information, including a unique scanner identifier, and network level and battery status information, preferably to all registers 104 and 105a-105b via IP Multicast. Advantageously, guaranteed transmission of the status information is not required, because even if information is lost, another status broadcast will be sent out the next time this thread executes. Finally, a thread is provided for monitoring a socket for commands from a register 104 or 105a-105b, for example, pages and locate signals.

Figure 3:
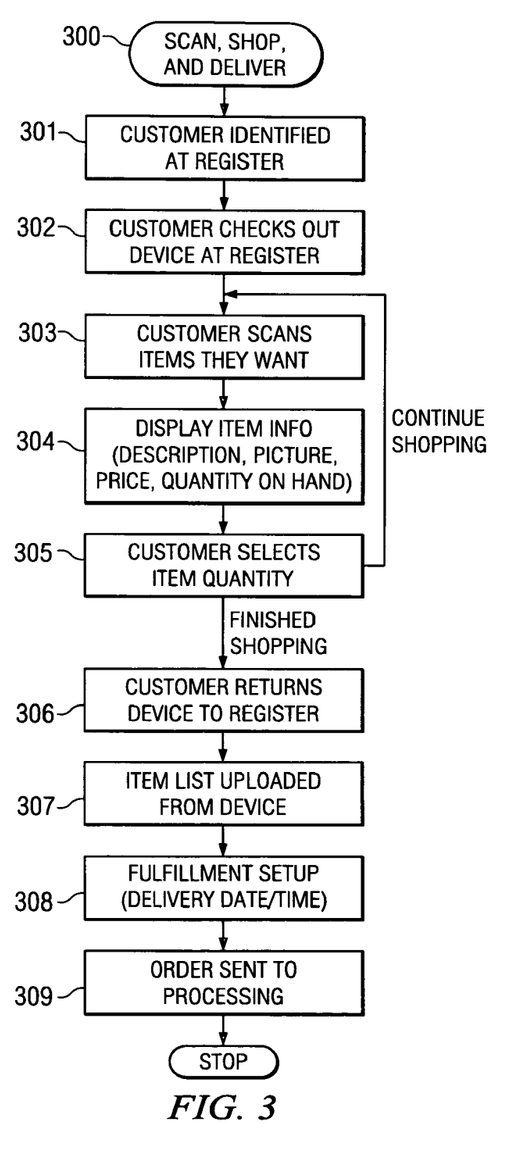
FIG. 3 is a flow chart illustrating typical operations of the system shown in FIG. 1A according to the principles of the present invention.

The overall operation of shopping system 100 is illustrated by exemplary scan, shop, and deliver procedure 300 shown in the flow chart of FIG. 3. At block 301, a customer enters the store and is identified at one of the registers 104 and 105. In the illustrated embodiment, a store clerk accesses the computer screen shown in FIG. 4A from the terminal at a given register 104 or 105a-105b and selects the CUSTOMER tab. If a customer is an existing customer, then the customer's information profile is pulled-up from the database. For a new or unregistered customer, a new customer profile is created by entering the customer's information such name, address, telephone number, and preferred delivery information.

Figure 4A:
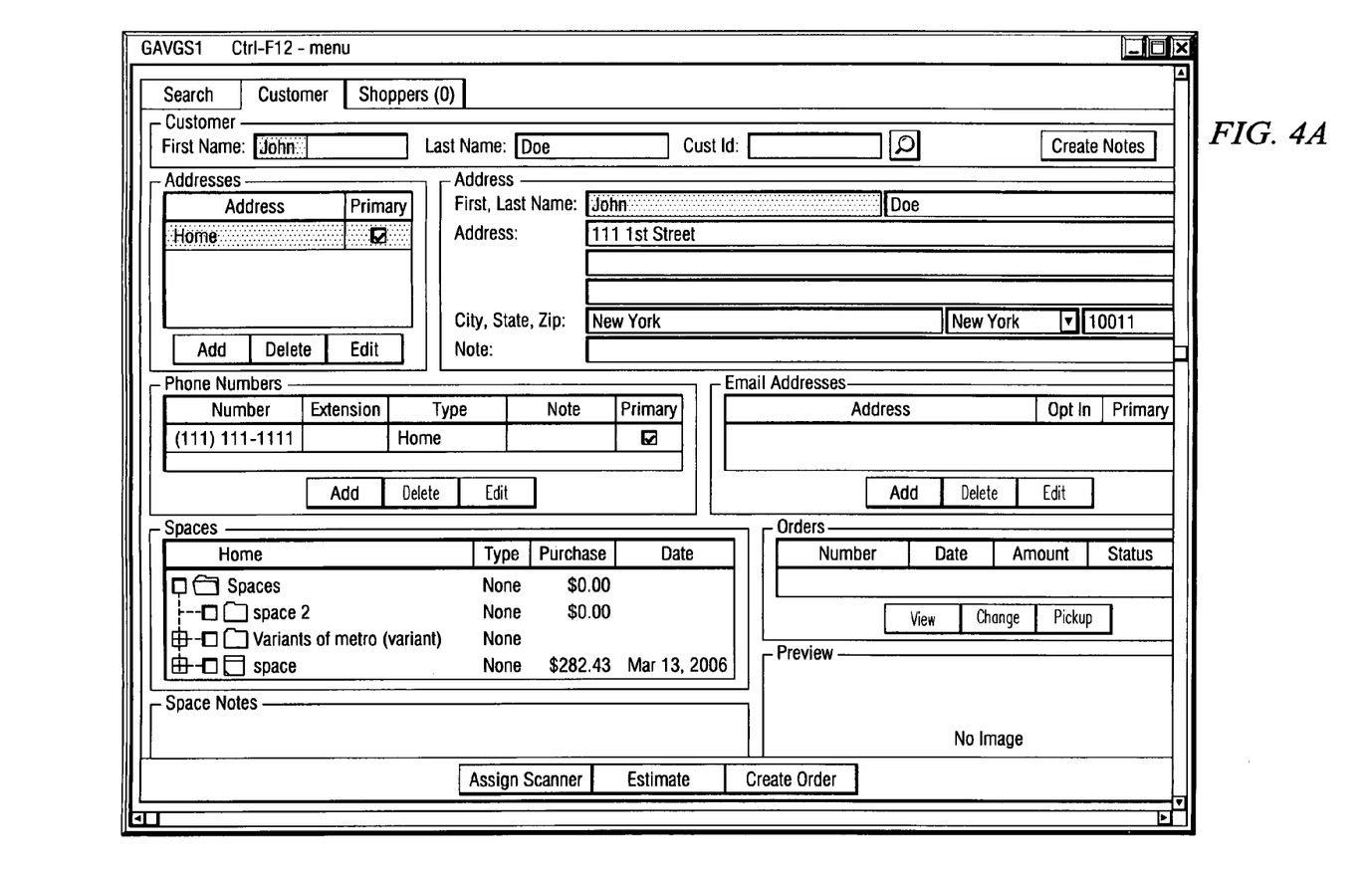
FIGS. 4A-4I are conceptual diagrams illustrating the various display windows displayed on the display screens of the registers of FIGS. 1C and 1D and the handheld scanner of FIG. 2 during the operations illustrated in FIG. 3.
Figure 4B:
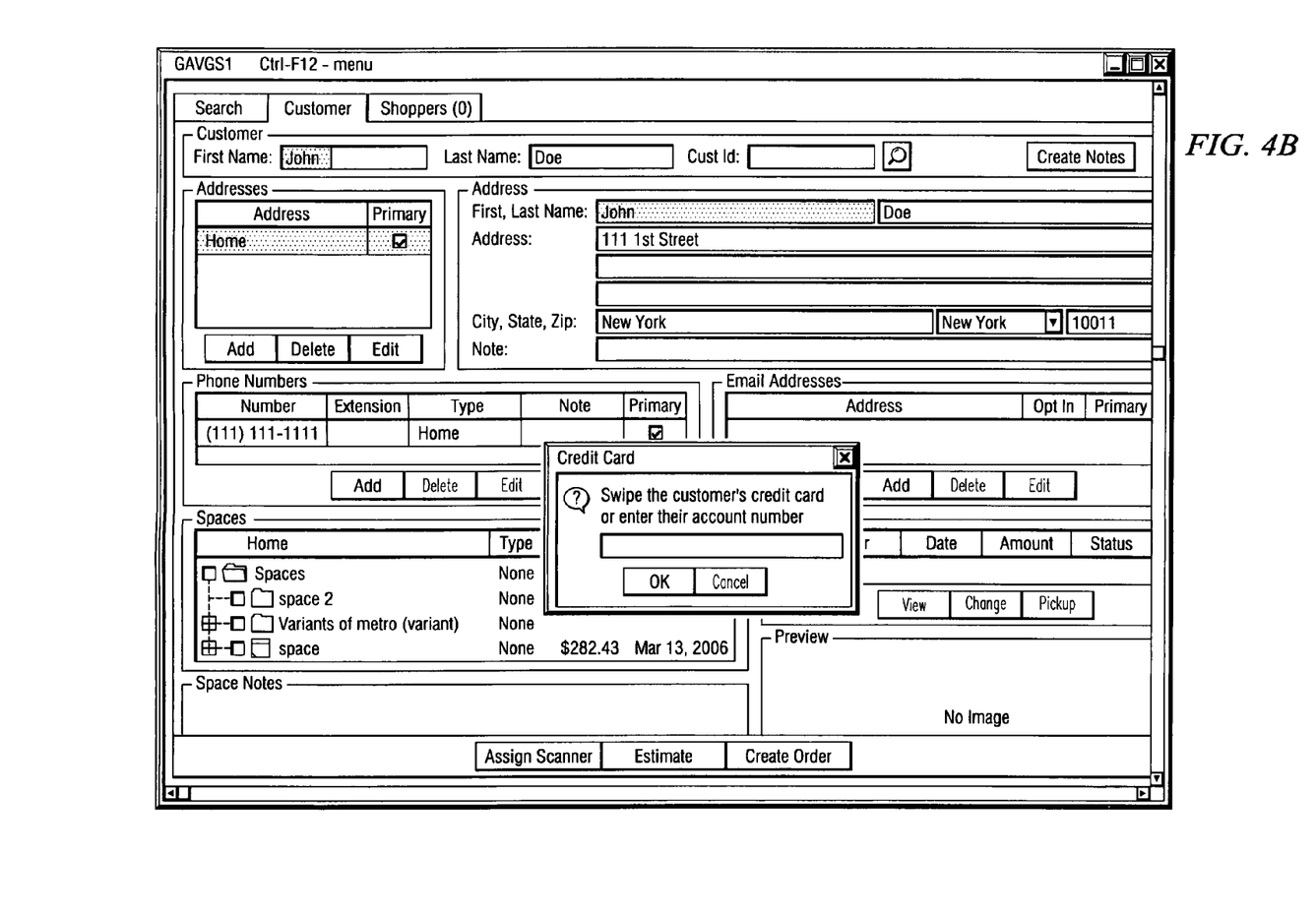
Figure 4C:
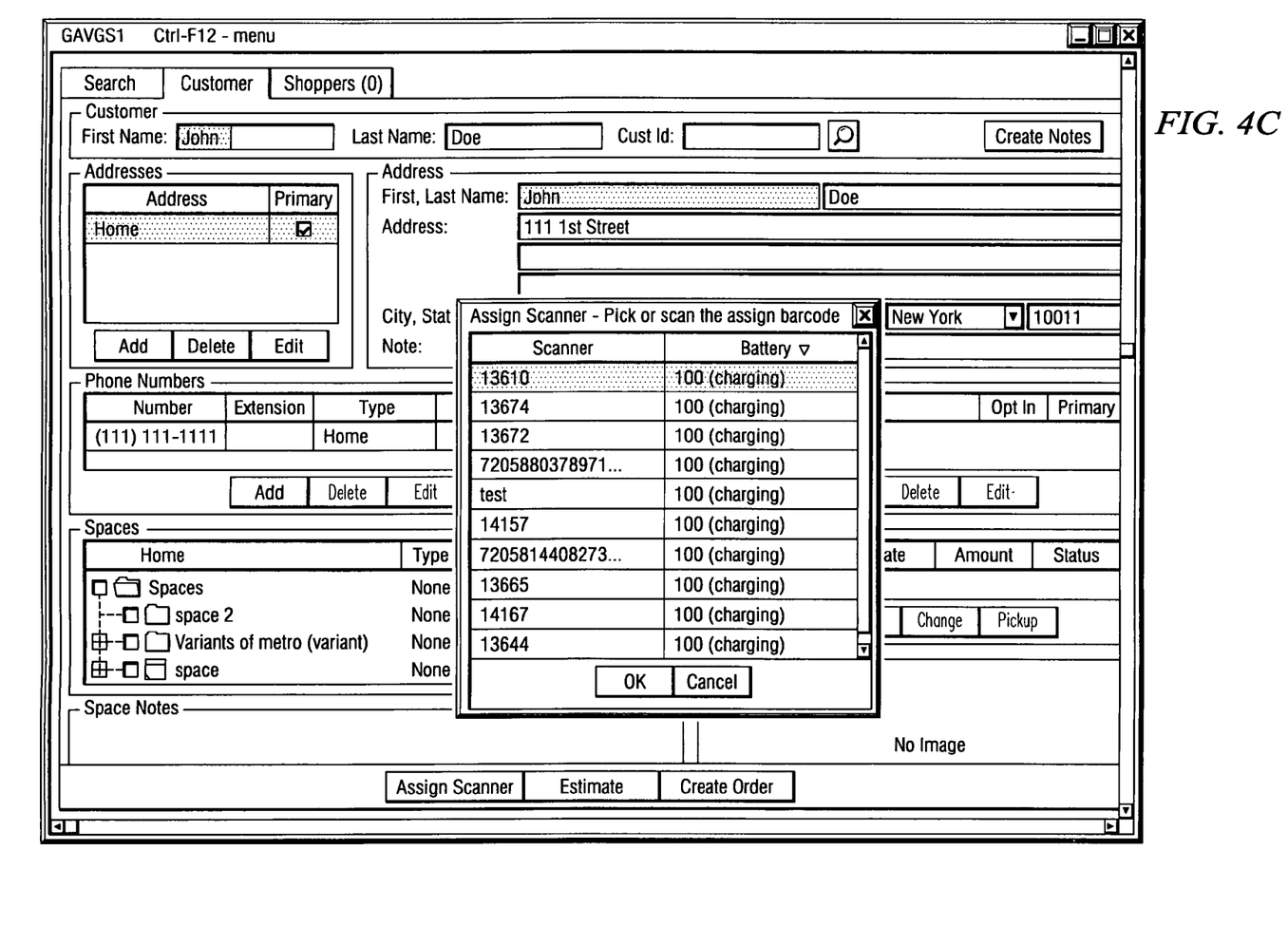

At block 302 of FIG. 3, the process of checking out a hand-held scanner 200 to the identified customer is performed. First, as shown by FIG. 4B, the customer's credit card number is entered either by swiping or manual entry after prompting by a dialog box. A second dialog box then lists the available scanners, and their battery levels for the store clerk to select, as shown in FIG. 4C. Once a scanner is selected from this list, its display entry will start flashing off and on. Alternatively, a hand-held scanner 200 can be pulled from its charger and used to scan a special barcode at the register. The selected hand-held scanner 200 will signal the register that it is the one being assigned. A scanner 200 with a full battery charge will illuminate onboard LEDs green and a scanner 200 that is not fully charged will not illuminate these LEDs. This reduces the chance of assigning a customer a scanner that is not fully charged.

Figure 4D:
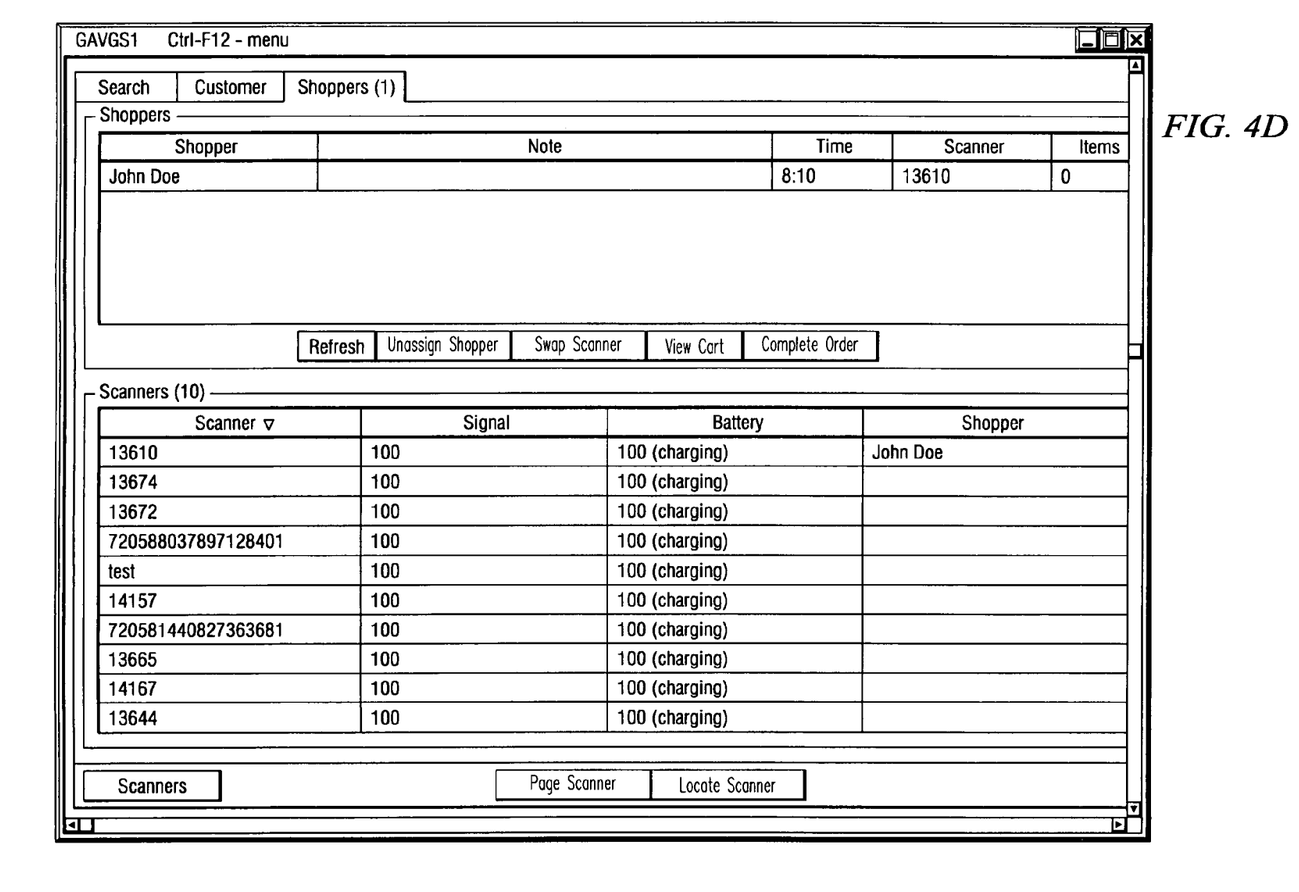

As shown in FIG. 4D, when a customer is assigned a scanner 200, the display window found under the SHOPPERS tab is updated. In the illustrated embodiment, the SHOPPERS tab is made up of two tables. The upper (shopper's) table displays information about the specifically assigned customer including, for example, a short note about the customer (that can be entered when scanner 200 is assigned), the time the customer started using shopping system 100, the scanner's identifier, and the number of items in the customer's virtual shopping cart. The lower (scanner) table is used to status all scanners 200 in the store and includes information such as each scanner's identifier, its current network signal strength, its battery level and charging status, and the assigned customer's name, if any.

The shopper's table has a number of buttons below it that allows the register operator to interact with customers. In particular, the UNASSIGN SHOPPER button is used to remove a customer from shopping system 100. Preferably, the operator must pick from a list of reasons why the customer is being removed, for example, because the customer abandoned the scanner, changed their mind regarding a product, could not wait, decided to shop online, or decided to come back another day. The customer is then removed from the shopper table, and their scanner 200 is returned back to the unassigned state.

The SWAP SCANNER button is used when a customer's assigned scanner 200 is to be replaced with another scanner. This can happen, for example, if the assigned scanner 200 is malfunctioning or has low battery level. The virtual shopping cart from the assigned scanner 200 is removed and transferred to another scanner 200 so that the customer can continue shopping. The VIEW CART button will display on the register a table of items that represent the items in the customer's virtual shopping cart. (The register also keeps a backup copy of each virtual shopping cart in the system.) This function is used to monitor customers, but can also be used to create an order if the assigned scanner 200 is completely dead and the entries in a virtual shopping cart are lost. The COMPLETE ORDER button is used to create an order for the customer by pulling the virtual shopper cart from the scanner 200 for processing the on the shop register 104 or 105a-105b. (Registers 104 and 105a-105b are better suited to pick fulfillment types for the order, and also resolve order problems, such as availability issues and delivery dates.)

The scanner table also has buttons for performing functions on scanners 200. In particular, The PAGE SCANNER button is used to send a message to a particular scanner 200. For example, if the register operator notices that a scanner 200 has a low battery, the register operator can send a message to the assigned customer and have them return to the register 104 or 105a-105b so that a different scanner 200 can be swapped in. The LOCATE SCANNER button is used to find missing scanners. When clicked-on, the selected scanner 200 will start making loud noises until it can be located and shutoff. The SCANNER button is used to manage the store's inventory of scanners. For example, unique data can be entered for each scanner 200 in the store, such as the asset ID number, device serial number, and a note.

Returning to the flow chart of FIG. 3, once a customer has been assigned a scanner 200, they are free to shop around the store and scan the bar codes on items they wish to purchase (block 303). Each time a product bar code is scanned, a display is generated on the display 201 of the customer's scanner 200.

Figure 4E:
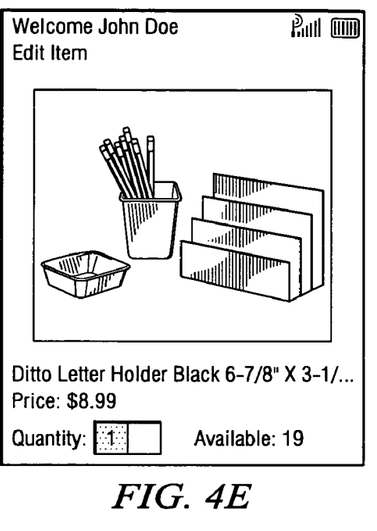

One preferred scanner display is shown in FIG. 4E. The top line of the display displays the assigned customer's name and graphics that represent the network connectivity and battery levels. In particular, the network meter resembles a typical cell phone signal meter, which changes color to yellow and then red if the network level is too low. The battery meter resembles a typical cell phone battery meter, and also changes to yellow and then red when the battery level is low.

When a customer scans a barcode on a product, its image, description, price, and the store's on-hand quantity are displayed, also as shown in FIG. 4E. At block 304 of FIG. 3, the customer utilizes keypad 202 of FIG. 2 to enter the desired quantity of the selected item.

Figure 4F:
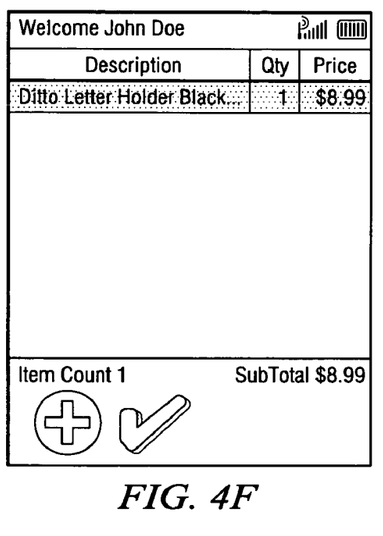
Figure 4G:
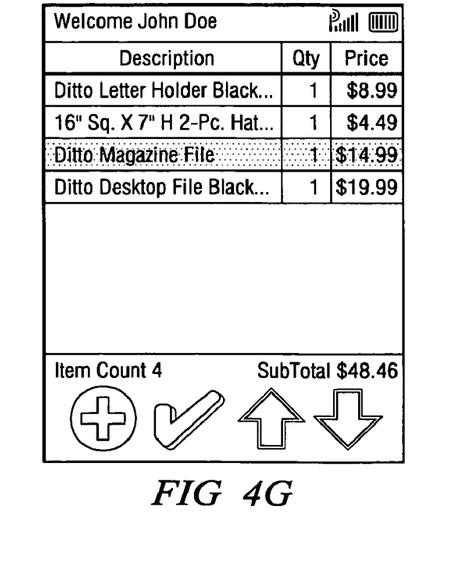
Figure 4H:
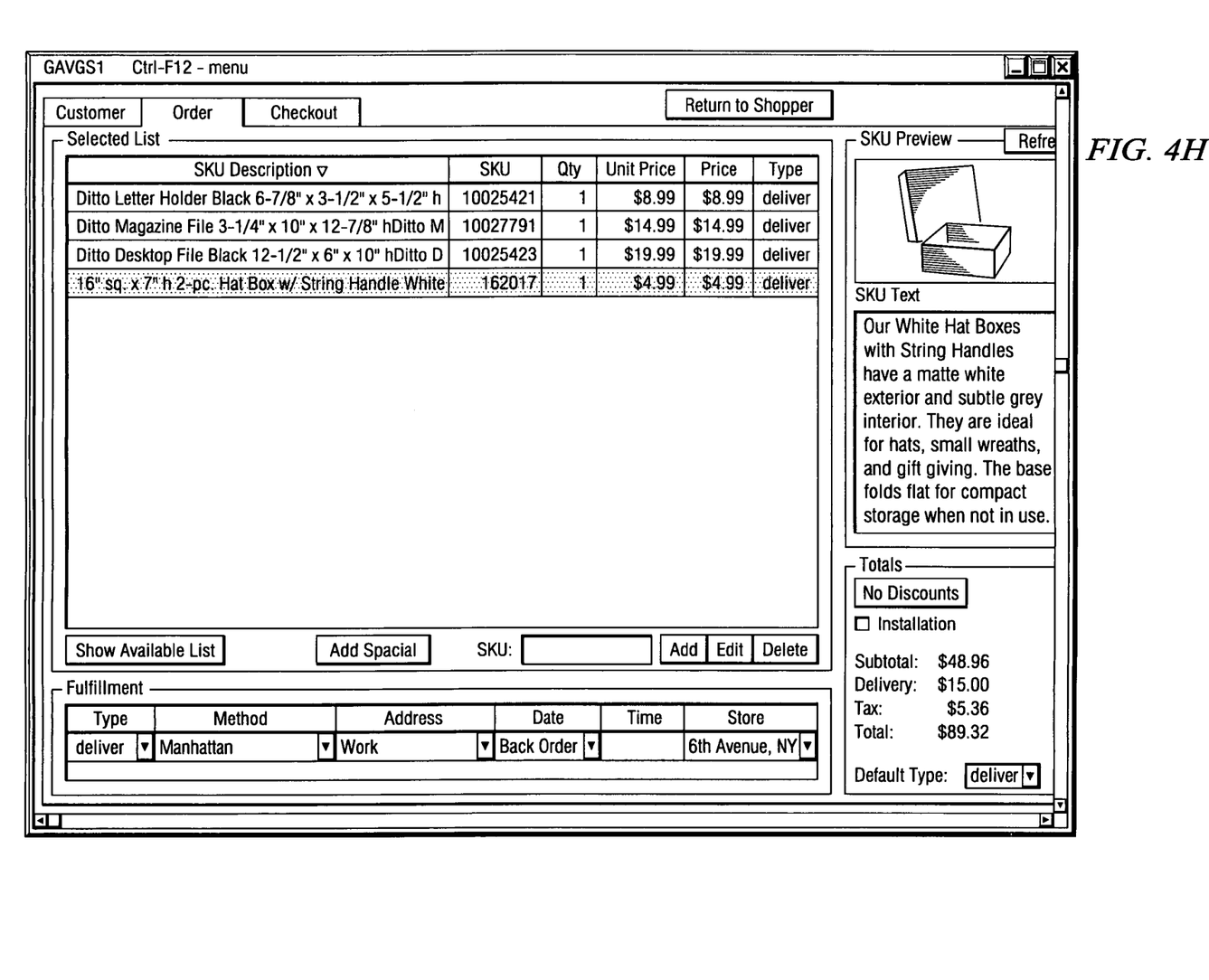
Figure 4I:
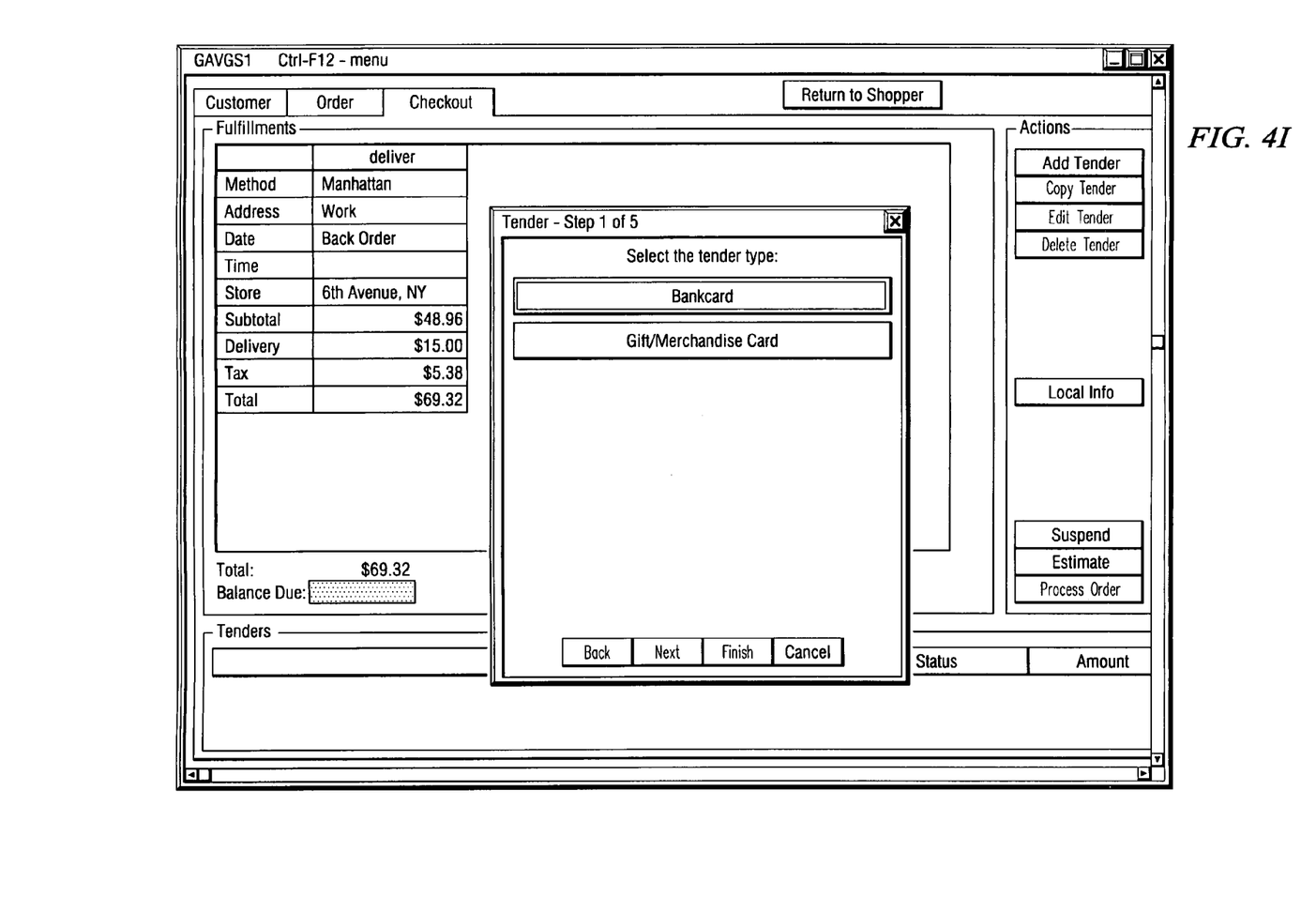

After the customer hits the enter button on keypad 202, the item is added to their item table (virtual shopping cart). A preferred display of the item list is shown in FIGS. 4F and 4G. The item table lists the items that the customer has added to their virtual shopping cart. Each item entry displays a textual description of the item, the quantity selected, and the extended item price (quantity multiplied by single item price). When the item list is displayed, the bottom part of the screen is occupied by 4 buttons. These buttons allow the customer to get details on an item, delete an item, or select the previous or next item in the item list.

Every time a scanner 200 updates its item list, it also sends a message to the main register 104. The message describes the action taken (e.g. add item, modify item, delete item). Main register 104 receives the message, and forwards it to secondary registers 105a-105b. Furthermore, whenever a scanner 200 needs item information, such an item description, item image, price, and on-hand quantity, it communicates over a socket with the main register 104. If the customer is in a part of the store where the wireless network is not available at the time they scan an item, the item information cannot be retrieved from the register. In this case, the item is added to the item list by its UPC with an unknown price. A table refresh thread executing on the assigned scanner 200 updates the item table with the missing information when the network becomes available.

As the customer continues to shop, and scan in additional items, the steps represented by blocks 303-305 of FIG. 3 are repeated. The item list of FIG. 4G is updated, including the order subtotal displayed below the item table. Anytime during the process, the customer can adjust item quantities and/or delete items using the provided buttons described above.

When the customer has finished shopping at block 306, they return to a register 104 or 105a-105b with their assigned scanner 200 and complete their transaction. Specifically, the item list stored on the assigned scanner 200 is uploaded to the register 104 or 105a-105b. A checkout screen, such as that shown in FIG. 4H, allows the sales clerk to confirm product availability, the delivery address, and delivery time. The tender is added and the order processed, through the check out screen shown in FIG. 4I.

Shopping system 100 also embodies software allocation engine, which manages the delivery quoting and fulfillment process for delivery orders. Advantageously, this process is not limited to the store that captured the order from the customer. In particular, the allocation engine has access to companywide inventory and can reserve inventory at any combination of locations to fill an order. This creates the opportunity to profitably offer customers more delivery options and a higher service level.

Figure 5:
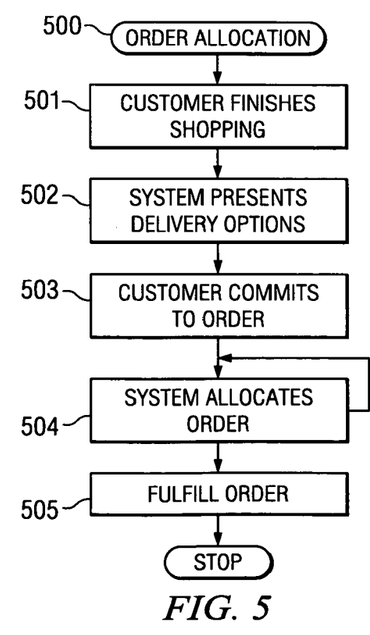
FIG. 5 is a flow chart of an exemplary order allocation process according to the principles of the present invention.

FIG. 5 is a flow chart of an order allocation process 500 illustrating the operation of the allocation engine of shopping system 100, according to one embodiment of the present invention. In particular, the allocation engine is invoked after the customer completes shopping at block 501, as described in detail above.

At block 502, the customer is presented with delivery time windows that are achievable based on inventory availability and processing and facilities capacity. Once the customer places the order and their delivery expectations are established, the allocation engine creates a fulfillment strategy that is optimized to meet the customer's expectations while also maximizing sales and minimizing costs to the retailer.

Specifically, at block 502, the order is analyzed to determine which products the customer has chosen for delivery and the customer's deliver preferences. The allocation engine then determines the earliest possible time and the most efficient delivery path from one of the retailer's facilities to the customer's indicated delivery address. The allocation engine next determines the facilities available processing slots starting with the earliest time and date that the inventory is available. Finally, the available delivery time window options are presented to the customer so that, at block 503, the customer can commit to the order based on the delivery option selected by the customer.

At block 504, the allocation engine allocations the order. First, based on the customers deliver option selection, the allocation engine calculates the best fulfillment strategy to meet the customer's expectation and then reserves the merchandise. If and when the inventory status changes, the allocation engine recalculates the best fulfillment strategy until the order is completely fulfilled, at block 505.

The process described in FIG. 5 can be more completely illustrated with the following examples. A customer uses shopping system 100 at a retail facility close to their home and decides they want their order delivered in two (2) days. The allocation engine first selects that same retail facility as the delivery point (i.e. as the least-cost fulfillment facility). However, assume the allocation engine determines that this fulfillment facility/delivery point does not currently have enough inventory to meet the customer's order requirements and that there is insufficient time to order the balance of the inventory from a distribution center (or any other available facility).

In this example, the allocation engine is, however, able to determine that some of the balance can be filled from a replenishment shipment that is currently in route and due to deliver in two (2) hours to the retail facility. Additionally, the allocation engine is also able to determine that the remainder of the order can be filled from another replenishment shipment due at the retail facility in ten (10) hours. The allocation engine therefore reserves the inventory from the facility and both in-transit shipments to fill the order on time. When the last shipment's inventory is secured for the order, the allocation engine releases the order for delivery.

Preferably, in terms of store product service levels, the allocation engine attempts to allocate inventory from a source that does not jeopardize a store's pipeline of available inventory for pedestrian customer sales. This feature advantageously helps ensure that the maximum number of customers have access to the maximum variety of products. As another example, assume a customer uses shopping system 100 at a retail facility close to their home and decides they want their order delivered in three (3) days. The allocation engine selects that retail facility as the delivery point (i.e. least-cost facility) and determines that it can fulfill the customer's order by taking the merchandise from the selling floor of the same retail facility. However, the allocation engine also determines that it can get additional inventory to fill the order from a distribution facility that is scheduled to replenish the retail facility in two (2) days. The allocation engine therefore selects the second option because it allows the retail facility to sell the floor inventory (through selling opportunities that require the inventory to be present) during those two (2) days. Advantageously, the profit from those sales typically exceeds the incremental cost of adding the additional inventory to fill the order to the replenishment truck.

Additionally, to minimize freight costs, the allocation engine attempts to select locations that are the most efficient to process the order. Generally, this means selecting the closest delivery-capable facility or facilities to the customer's delivery point. Similarly, in the event that the allocation engine must allocate inventory from an intermediate facility and that inventory must subsequently be shipped to, and consolidated at, the chosen delivery facility, the allocation engine attempts to aggregate inventory requirements into full truck deliveries to minimize freight charges.

As further example, assume a customer uses shopping system 100 at a retail facility close to their home and decides they want their order delivered in three (3) days. Once the order is placed, the allocation engine determines that there are two facilities that can service the order, and that the freight charges from one facility will be $15 and from the other $120. In this case, the allocation engine selects the facility corresponding to the $15 freight charges as the delivery point. Further, if the allocation engine also determines that the delivery facility needs additional inventory to complete the order, and that the needed inventory can either be transferred from another store for freight charges of $25 or simply added to a scheduled replenishment shipment from a distribution center for an incremental $5 in freight charges, the allocation engine will select the option with the $5 incremental freight charges.

The allocation engine also has access to projected product demand requirements for each facility. With this information, the engine attempts to reduce inventory at facilities that have a large day's supply relative to the carrying costs of the facility. This advantageously reduces carrying costs and improves the retailer's companywide cash flow. Similarly, the allocation engine attempts to minimize work in process inventory (e.g. partial orders staged for consolidation).

Consider an example, in which a customer uses shopping system 100 at a retail facility close to their home and decides that they want their order delivered in two (2) days. Once the order is placed, the allocation engine determines that there are two facilities that can service the order. In this case, the cost of fulfill the order is the same for both facilities; however, one of the facilities is overstocked with the desired product. Therefore, the allocation engine designates the overstocked facility to fulfill the order. In the event that one of the products is overstocked and another will be arriving on a replenishment truck in a short time (to complete the order), the allocation engine will wait until the replenishment shipment arrives to call for pick of the entire order. As a result, the entire order is picked at the same time (no consolidation steps) and the picked order is available in a staging location for the minimum amount of time.

In other words, shopping system 100 works with the allocation engine during the delivery window quoting process so that customers are quoted delivery windows that help even-out demand among delivery facilities. This allows each facility to better plan and utilize its fulfillment labor, real estate, and equipment. It also helps ensure that a facilities order processing capacity is not exceeded.

In sum, the various embodiments of the principles of the present invention realize significant advantages, especially within a high service retail environment. In particular, shopping system 100 makes the shopping experience much less of a burden for the shopper. For example, the use of scanners means that a customer does not need to carry merchandise through the store or push an unwieldy shopping cart. The scanner allows the customer to easily select and change purchase quantities and immediately provides the customer with important information such as the price of the item, the amount of product currently available in the store, and a running total for the products in the customer's virtual shopping basket. The customer can page the register if assistance is required. Moreover, waiting time in line is significantly reduced, as the need for register scanning of items is no longer required for customers using the system. Furthermore, shopping system 100 provides delivery options to the customer providing even further convenience.

Shopping system 100 also realizes significant advantages for the retailer, as well. These advantages increase sales per store visit and customer goodwill. For example, the retailer can easily identify valued return customers and first time customers with the potential to become return customers. Assistance can be immediately provided to customers that require it. Overall, shopping system 100 allows the retailer to efficiently manage its inventory and fulfill orders, which in turn allows the retailer to meet customers' delivery expectations, as well as minimize the retailer's product handling costs.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A computer assisted shopping system comprising:
   a hand-held scanner for customer scanning of information associated with a product in a retailing facility, the hand-held scanner including a display for displaying shopping cart information corresponding to customer scanned information including an image of the product, a unit price of the product, and an amount of the product currently available at the retailing facility; and
   a networked system operable to:

store customer delivery preference information;
download information from the hand-held scanner scanned by customer to a register;
generate a product order at the register from the information downloaded from the scanner and the customer delivery preference information;
determine available delivery date and time windows based on inventory availability;
provide delivery options for the customer based on available delivery date and time windows;
accept a delivery option selection and commitment from the customer to close the order; and
calculate a fulfillment strategy to meet the selected delivery option based on available inventory at a plurality of facilities including local inventory at the retailing facility and which maximizes remaining available inventory local to the retailing facility.

2. The shopping system of claim 1, wherein the networked system calculates a fulfillment strategy based on local inventory at the retailing facility and inventory in transit to the retailing facility.

3. The shopping system of claim 1, wherein the networked calculates a fulfillment strategy bused on minimizing freight charges.

4. The shopping system of claim 1, wherein the information associated with the product is affixed to the product.

5. A computer assisted shopping system comprising:
a hand-held scanner for customer scanning of information associated with a product in a retailing facility, the hand-held scanner including a display for displaying shopping cart information corresponding to customer scanned information including an image of the product, a unit price of the product, and an amount of the product currently available at the retailing facility; and
a networked system operable to:
store customer delivery preference information;
download information from the hand-held scanner scanned by customer to a register;
generate a product order at the register from the information downloaded from the scanner and the customer delivery preference information;
determine available delivery date and lime windows based on inventory availability;
provide delivery options for the customer based on available delivery date and time windows;
accept a delivery option selection and commitment from the customer to close the order; and
calculate a fulfillment strategy to meet the selected delivery cation based on available inventory at a plurality of facilities including local inventory at the retailing facility and overstock of at least one of the plurality of facilities such that overstock is reduced.

6. A method of computer assisted shopping comprising:
providing a hand-held scanner to a customer for scanning information associated with a product within a retailing facility;
storing customer delivery preference information;
displaying shopping cart information on the hand-held scanner in response to information scanned by the customer information including an image of the product, a unit price of the product, and an amount of the product currently available at the retailing facility;
downloading the information scanned by the customer from the hand-held scanner to an information processing system;
generating a product order from the downloaded information with the information processing system and the customer delivery preference information;
determining with the information processing system available delivery date and time windows based an inventory availability;
providing delivery options to the customer based on available delivery date and time windows;
accepting a delivery option selection and commitment from the customer to close to the order; and
developing an order fulfillment strategy to meet the delivery option selection comprising:
determining whether the order can be fulfilled from local inventory at the retail facility;
fulfilling the order from the local inventory when the desired product quantity is available in the local inventory;
when the desired product quantity is unavailable in local inventory, determining whether sufficient additional product is available in inventory in-transit to the retail facility; and
fulfilling the order at least in part from the inventory in-transit upon arrival at the retail facility when sufficient additional product is available in the inventory in-transit.

7. The method of claim 6, wherein fulfilling the order comprises:
determining that a plurality of facilities are available to fulfill the order;
determining that a selected one of the facilities is overstocked with the product; and
fulfilling the order from the overstocked facility.

8. The method of claim 6, wherein the shopping cart information is selected from the group consisting of:
a list of all products having associated information scanned by the customer; and
a running total cost for the products having associated information scanned by the customer.

9. The method of claim 8, further comprising periodically refreshing the shopping cart information on the hand-held scanner from the information processing system as the scanner is moved through areas of the retailing facility with differing wireless network signal powers.

10. The method of claim 6, further comprising
monitoring the battery power on the hand-held scanner with the information processing system; and
signaling the customer through the hand-held scanner to return to a central location to receive a replacement scanner when the battery power is low.

11. A method of computer assisted shopping comprising:
providing a hand-held scanner to a customer for scanning information associated with a product within a retailing facility;
storing customer delivery preference information;
displaying shopping cart information on the hand-held scanner in response to information scanned by the customer information including an image of the product, a unit price of the product, and an amount of the product currently available at the retailing facility;
downloading the information scanned by the customer from the hand-held scanner to an information processing system;
generating a product order from the downloaded information with the information processing system and the customer delivery preference information;

determining with the information processing system available delivery date and time windows based on inventory availability;

providing delivery options to the customer based on available delivery date and time windows;

accepting a delivery option selection and commitment from the customer to close to the order; and developing an order fulfillment strategy to meet the delivery option selection comprising:

determining that the order can be fulfilled from a plurality of available facilities; and fulfilling the order at least in part from a selected one of the plurality of facilities to maximize product shelve availability for another one of the plurality of facilities.

12. The method of claim 11, wherein a first one of the facilities comprises a retailing facility closest to a delivery address provided as a customer delivery preference and second one of the facilities comprises a distribution facility and wherein fulfilling the order comprises fulfilling the order from a shipment from the second facility to the first facility to maximize product shelf availability at the first facility.

13. A method of computer assisted shopping comprising:

providing a hand-held scanner to a customer for scanning information associated with a product within a retailing facility;

storing customer delivery preference information;

displaying shopping cart information on the hand-held scanner in response to information scanned by the customer information including an image of the product, a unit price of the product, and an amount of the product currently available at the retailing facility;

downloading the information scanned by the customer from the hand-held scanner to an information processing system;

generating a product order from the downloaded information with the information processing system and the customer delivery preference information;

determining with the information processing system available delivery date and time windows based on inventory availability;

providing delivery options to the customer based on available delivery date and time windows;

accepting a delivery option selection and commitment from the customer to close to the order; and developing an order fulfillment strategy to meet the delivery option selection comprising:

determining that the order can be fulfilled from a plurality of available facilities; and fulfilling the order from a selected one of the plurality of facilities to minimize freight charges.

14. The method of claim 13, wherein fulfilling the order from the selected one of the facilities comprises shipping the product from one facility to the retail facility and fulfilling the order from the retail facility.

15. The method of claim 13, wherein fulfilling the order from the selected one of the facilities comprises shipping the product to the customer directly from the selected one of the facilities.

16. A computer assisted shopping system including:

a set of hand-held scanners for providing to customers for scanning information associated with merchandise available for purchase, each hand-held scanner including a display for displaying shopping cart information corresponding to the scanned information including an image of the product, a unit price of the product, and an amount of the product currently available at the retailing facility;

a networked system including at least one register and a wireless network for establishing communications between the register and the hand-held scanners, wherein the networked system is operable to:

store customer delivery preference information for a plurality of registered customers;

assign a selected scanner to a registered customer;

monitor the selected hand-held scanner as the customer shops the available merchandise;

download information from the selected hand-held scanner and associated with merchandise scanned by the customer to the register;

generate a product order at the register from the information downloaded from the scanner and the corresponding customer preference information;

determine available delivery date and time windows based on inventory availability and the customer preference information;

provide delivery options for the customer based on available delivery date and time windows and the customer delivery preference information;

accept a delivery option selection and commitment from the customer to close the order; and calculate a fulfillment strategy to meet the selected delivery option and reserve the corresponding merchandise based on available inventory at a plurality of facilities including local inventory at the retailing facility and which maximizes remaining available inventory local to the retailing facility.

* * * * *